United States Patent [19]
Keller et al.

[11] Patent Number: 5,945,205
[45] Date of Patent: Aug. 31, 1999

[54] OPAQUE FILM COMPOSITIONS

[75] Inventors: Lajos E. Keller, Luxembourg; Jean-Pierre Frognet, Virton, both of Belgium

[73] Assignee: Mobil Oil Corporation, Fairfax, Va.

[21] Appl. No.: 09/123,978

[22] Filed: Jul. 29, 1998

Related U.S. Application Data

[63] Continuation of application No. 08/146,465, Nov. 2, 1993, abandoned, which is a continuation of application No. 07/809,723, Dec. 17, 1991, abandoned, which is a continuation-in-part of application No. 07/780,577, Oct. 22, 1991, abandoned, which is a continuation of application No. 07/295,919, Dec. 29, 1988, abandoned.

[51] Int. Cl.$^6$ .............................. B29C 55/12; B32B 3/26; B32B 27/32
[52] U.S. Cl. ....................... 428/213; 156/229; 264/210.7; 428/315.7; 428/315.9; 428/317.9; 428/318.6; 428/324; 428/910
[58] Field of Search ................................. 428/213, 314.8, 428/315.7, 315.9, 317.9, 324, 325, 327, 500, 517, 519, 910, 318.4; 156/196, 229; 264/210.7

[56] References Cited

U.S. PATENT DOCUMENTS

| | | | |
|---|---|---|---|
| 4,168,986 | 9/1979 | Venis, Jr. .................................. | 106/291 |
| 4,758,462 | 7/1988 | Park et al. ................................ | 428/213 |

FOREIGN PATENT DOCUMENTS

| | | |
|---|---|---|
| 0 143 567 A2 | 6/1985 | European Pat. Off. . |
| 0 155 595 | 9/1985 | European Pat. Off. . |
| 3 401 218 | 7/1985 | Germany . |

OTHER PUBLICATIONS

*Hawley's Condensed Chemical Dictionary*, Eleventh Edition, Van Nostrand Reinhold Co., New York, 1987, pp. 219, 576, (no month).

*Whittington's Dictionary of Plastics*, 1$^{st}$ Ed., Technomic Publishing Co., Inc., Stamford, CT, 1968, pp. 37, 119, 140, (no month).

*Ullmann's Encyclopedia of Industrial Chemistry*, Fifth, Completely Revised Edition, vol. A20, 1992, pp. 346–365, 367–369, (no month).

Kirk–Othmer, Encyclopedia of Chemical Technology, vol. 17, Third Edition, p. 813, Dec. 1982.

*Primary Examiner*—Blaine Copenheaver
*Attorney, Agent, or Firm*—Jessica M. Sinnott; Dennis P. Santini

[57] ABSTRACT

An opaque, biaxially-oriented polymeric film contains a matrix of (i) a thermoplastic polymeric material in which there are dispersed (ii) void-initiating solid particles, about which there are located opacifying voids, and a minor amount of (iii) a light-absorbing pigment particles having lamellar morphology.

19 Claims, No Drawings

OPAQUE FILM COMPOSITIONS

This is a continuation of application Ser. No. 08/146,465 filed Nov. 2, 1993, now abandoned, which is a continuation of application Ser. No. 07/809,723 filed Dec. 17, 1991, now abandoned, which is a continuation-in-part of application Ser. No. 07/780,577 filed Oct. 22, 1991, now abandoned, which is a continuation of application Ser. No. 07/295,919 filed Dec. 29, 1988, now abandoned.

FIELD OF THE INVENTION

This invention relates to polymeric film structures of improved opacity; more particularly, this invention relates to pigmented films, and to their manufacture.

BACKGROUND OF THE INVENTION

In the packaging of certain types of foods, such as snack foods like potato chips, cookies and the like, it is common practice to employ a multi-layer film. A desirable property in such a packaging film is an opacity which protects the packaging product from deterioration caused by exposure to light. In particular, it has been found that certain wavelengths of light, up to about 450 nm cause increased spoilage in such packaged products. Even when a degree of opacity is present in the film, spoilage occurs if the film allows passage of some light.

It is known in the art that thermoplastic polymers can be loaded with inert fillers, cast into films, and thereafter stretched to form oriented thermoplastic films. While this statement is generally true, it must be realized that the particular components employed and the specific process parameters employed, particularly when control is difficult, can result in significantly different end products or contribute to the success or failure of obtaining a desired result. As an example, U.S. Pat. No. 4,118,438, discloses the use of some materials similar to those contemplated by the present invention, however, the object of U.S. Pat. No. 4,118,438 is diametrically opposed to the object of the present invention. U.S. Pat. No. 4,118,438 is concerned with a transparent polypropylene film containing fine particles of an incompatible polymer dispersed therein. The film disclosed exhibits surface projections caused by the dispersed particles and the patentees maintain that this gives the transparent film non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

European Patent Application 87307442, filed on Aug. 24, 1987, (Publication No. 258020, published on Mar. 2, 1988), the entire contents of which are incorporated herein by reference, describes and claims a film structure which comprises: (a) a voided core layer comprising a matrix of (i) a thermoplastic polymeric material in which are dispersed (ii) void-initiating solid particles which are phase-distinct from the thermoplastic polymeric material of the matrix and about which particles are located opacifying voids and a minor amount (iii) of a light absorbing pigment; and (b) at least one transparent skin layer adhering to the surface of the voided core layer comprising a thermoplastic polymeric material which is sufficiently thick to substantially prevent the asperities of the core layer from being manifest, the light transmission of the structure being less than about 15%.

Ashcraft et al, U.S. Pat. No. 4,377,616, which is incorporated herein by reference, discloses an opaque, biaxially-oriented polymeric film structure comprising a thermoplastic core matrix having a strata of voids created by the inclusion within the matrix of spherical void-initiating solid particles incompatible with the matrix.

It is a primary object of this invention to provide films of enhanced opacity for a comparable pigment loading or of comparable opacity for a reduced pigment loading.

SUMMARY OF THE INVENTION

There is provided an opaque, biaxially-oriented, polymeric film which comprises a matrix of (i) a thermoplastic polymeric material in which are dispersed (ii) void-initiating solid particles which are phase-distinct from the thermoplastic polymeric material of the matrix and about which particles are located opacifying voids and a minor amount of (iii) a light-absorbing pigment which comprises pigment particles of a lamellar morphology.

A process for the preparation of the film comprises: mixing, preferably by melting together, a major proportion of the thermoplastic polymeric material (i) with a minor proportion of the void-initiating solid particles (ii); heating the mixture to a temperature above the melting point of the thermoplastic polymeric material (i); uniformly dispersing the void-initiating solid particles (ii), preferably as microspheres, throughout the thermoplastic polymeric material (i); uniformly dispersing a minor amount, suitably from 0.2 to 12 wt. %, preferably from 0.5 to 5 wt. %, of the light-absorbing pigment (iii) in the mixture; forming a film from the mixture; and biaxially orienting the film at a temperature and deformation ratio effective to form opacifying voids therein. The biaxial orientation is carried out in a conventional manner, e.g., that of Ashcraft et al, U.S. Pat. No. 4,377,616.

DETAILED DESCRIPTION OF THE INVENTION

The pigment particles of lamellar morphology (lamellar pigment) may comprise an organic pigment, preferably graphite, or an inorganic pigment, such as a silicate, preferably a silicate which has a pronounced tendency to cleave in one preferred planar direction, for example, a mica. Graphite is a particularly preferred lamellar pigment. The lamellar pigment should have an average particle size which, of itself, is insufficient to cause voiding of the matrix; this will depend on the nature of the matrix and the processing conditions, especially deformation temperature and the amount of the pigment in the matrix. The term "voiding of the matrix" as used herein designates creating a space within the matrix. However, good results are obtained when the lamellar pigment has an average particle size from 0.2 to 2.0 micrometers, preferably from 0.5 to 1.0 micrometers. The lamellar pigment may be present in an amount from 0.2 to 12 wt. %, suitably from 0.5 to 5.0 wt. % of the film, preferably from 1.0 to 2.0 wt. % of the film. The film may also contain a non-lamellar pigment which may comprise a light-reflecting pigment; for example titania. Such pigments may be selected from those conventionally used in the dyeing and/or coloring of synthetic resins, industrial coatings and paints, and may be organic or inorganic. Suitable colors and materials are well known to those skilled in the art: a list of various pigments is disclosed in Vol. 17, pages 788–889, of Kirk-Othmer "Encyclopedia of Chemical Technology", 3rd Edition (1982), the contents of which are incorporated herein by reference. Some exemplary pigments are carbon black, brown iron oxide, and iron blue.

Thermoplastic polymeric materials (i) which have been found to be useful in preparing the matrix of the film of this invention include polyolefins. A preferred class of such polyolefins is the semicrystalline polyolefin to which a high degree of biaxial orientation can be imparted by effective drawing (as distinct from drafting) in both the machine and transverse directions. Examples of such polyolefins include homopolyolefins, such as polyethylene, especially linear polyethylene, and polypropylene. Polypropylene is the preferred thermoplastic material for the preparation of the matrix of this invention.

The void-initiating particles (ii) may comprise an organic or an inorganic material and they preferably have a higher melting point and/or higher glass transition temperature than the thermoplastic polymeric materials (i). Preferably, the void-initiating particles comprise a polymeric material, suitably one which is co-meltable with the thermoplastic polymeric material (i) of the matrix. It is also contemplated that the void-initiating particles can be preformed and then uniformly dispersed into a melt of the polymeric material of the matrix; for example, of polypropylene. This has the advantage of not having to subject the polymeric material of the matrix to the melt temperature of a much higher melting polymer, thereby minimizing its thermal degradation. For convenience and more precise formulation control, master batching of the void-initiating particles may be employed in the manner known to those skilled in the art. Examples of polymeric materials which can be used to form the void-initiating particles of the dispersed phase within the thermoplastic polymeric material, preferably polypropylene, of the matrix include polyesters, especially poly(carboxylic esters), such as polybutylene terephthalate and polyethylene terephthalate; polycarbonates; polysulphones; polyacetates; polymers of acrylic esters; and nylon. Inorganic materials include solid or hollow, preformed glass, metal or ceramic spheres. In fact, any material which can be formed into spheres or other suitable shapes without causing thermal degradation to the core material may be used to form the void-initiating particles.

The void-initiating solid particles may be of any shape, although it is preferred that they are substantially spherical. Preferably, the void-initiating solid particles have an average particle size from 0.5 to 10 micrometers, preferably from 0.75 to 4 micrometers. If such particles are spherical, it has been found that they can produce, on biaxial deformation of the film, a statistical distribution of voids of generally biconvex lens shape with the two major average dimensions being greater than 30 micrometers. The void-initiating particles may be present in an amount up to 20 wt. % of the film, preferably from 2 to 10 wt. % of the film.

The invention also provides a film structure which comprises (a), as the voided core layer, the matrix as herein defined and (b) at least one transparent skin layer adhering to the surface of the voided core layer comprising a thermoplastic polymeric material, the skin layer being sufficiently thick to substantially prevent the asperities of the core layer from being manifest, the light transmission of the film structure being less than about 15%. Preferably, the film structure comprises three or more layers, with one central core layer and two or more supporting transparent skin layers adhering to the top and bottom of the central core layer. In order to achieve the film structure of the present invention, it is important that a particular relationship exist between the thickness of the core layer and the thickness of the skin layer or layers. It is preferred that the thickness of the core layer be between 30 and 95%, preferably between 40 and 95% of the thickness of the film structure.

In such a film structure, the lamellar pigment may be present in the core layer only. The skin layer or each of the skin layers may be transparent or may comprise a non-lamellar pigment. At least one skin layer may comprise the same polymeric material as the matrix of the voided core layer.

This invention further provides a process for the preparation of such a film structure which comprises, either simultaneously with, or subsequently to the film-forming step, adhering to at least one surface of that film (a) a transparent skin layer (b). Suitably, the adhering step is effected by lamination or coextrusion. The biaxial orientation is preferably effected after the adhesion of (b) and (a), and is preferably effected in both directions concurrently, suitably at a temperature above 100° C. The film structure can be used in a variety of applications, e.g., to package foodstuffs and as a decorative wrap paper.

The following Examples further illustrate the essential features of the invention. However, it will be apparent to those skilled in the art that the specific reactants and reaction conditions used in the Examples do not limit the scope of the invention.

EXAMPLES 1–6

A conventional, biaxially oriented, three layer, cavitated coextruded polypropylene film structure of gauge between 30 and 35 micrometers was prepared in a conventional manner, except that the core layer contained a lamellar light absorbing pigment (filler) as indicated in Table 1 below. A control containing no filler was also prepared.

TABLE 1

| | Filler | | | | |
|---|---|---|---|---|---|
| Example | Graphite (% wt.) | | Mica (% wt.) | $Fe_2O_3$ (% wt.) | Light Transmission (%) |
| | 0.8µ | 1.9µ | | | |
| Control | — | — | — | — | 20.1 |
| 1 | 1.07 | — | — | — | 3.4 |
| 2 | 1.25 | — | — | — | 2.5 |
| 3 | 1.25 | 0.1 | — | — | 2.5 |
| 4 | 1.0 | 0.25 | — | — | 3.0 |
| 5 | 1.25 | — | 0.1 | — | 3.2 |
| 6 | 1.25 | — | — | 0.1 | 2.3 |

It will be seen that the inclusion of little more than 1% by weight of the lamellar light-absorbing pigment reduces the light transmission of the formed film by an order of magnitude. The coextruded film resembles aluminum foil, except that it additionally exhibits a lustrous satin appearance. This is attained while maintaining: yield; unit weight; density; gauge; and water vapor transmission rate (WVTR) at comparable, sometimes marginally improved values, and increasing the gloss of the film of the invention, as compared to a conventional white cavitated film.

Greater loadings of lamellar light-absorbing pigment may be incorporated, if desired, into the film as illustrated in Examples 7–16.

EXAMPLES 7–16

Several coextruded polypropylene film structures were prepared in the same manner as in Examples 1–6, except that higher loadings of the lamellar filler were utilized, as specified in Table 2. The light transmission of such films was also measured and the results are also summarized in Table 2.

TABLE 2

| Example | Graphite (% wt.) 0.8μ | Graphite (% wt.) 1.9μ | Mica (% wt.) | Fe$_2$O$_3$ (% wt.) |
|---|---|---|---|---|
| 7 | 1.5 | — | — | — |
| 8 | 2.0 | — | — | — |
| 9 | 3.0 | — | — | — |
| 10 | — | — | 1.0 | — |
| 11 | 1.0 | — | 1.0 | — |
| 12 | — | — | 2.0 | — |
| 13 | 1.0 | — | — | 1.0 |
| 14* | 2.0 | — | — | — |
| 15* | 2.0 | — | — | — |
| 16* | 2.0 | — | — | — |

*These Examples have, respectively, 0.5%, 1.0% and 2.0% of a pigment incorporated in a coextruded skin layer in order to achieve a chosen color or shading.

It is found, when graphite is used as laminar pigment, that essentially no passage of light, particularly of UV light, direct or indirect, occurs through such film. This greatly reduces incidence of rancidity of foodstuffs when they are packaged in such a film.

EXAMPLE 17

The film of this example was produced for comparison with the films produced in the Examples 18 and 19.

A mixture of 92 percent, by weight, isotactic polypropylene (MP=320° F., melt index=3), containing 8 weight percent PBT (MP=440+ F.) as the core layer void-initiating material, is melted in an extruder with a screw of L/D ratio of 20/1 to provide the core layer mixture. A second extruder, in association with the first extruder, is supplied with the same isotactic polypropylene as the first extruder, this extruder used to provide the skin layer mixture. A melt coextrusion is carried out while maintaining the cylinder of the core polymer material at a temperature sufficient to melt the polymer mixture, i.e., from about 450° F. to about 550° F. or higher. The polypropylene mixtures of the second extruder to be used to form the skin layers is maintained at about the same temperature as the polypropylene used in fabricating the core layer. The mixture of the second extruder is split into two streams to enable the formation of skin layers on each surface of the core layer. As may be appreciated by those skilled in the art, rather than splitting the output of the second extruder into two streams, a third extruder could be used to supply the second skin layer mixture. Such an arrangement would be desired when the material used to form the second skin layer is varied from that of the first skin layer, when the thickness of the second skin layer is varied from that of the first skin layer, etc.

A three-layer film laminate was coextruded with a core thickness representing about 80 percent of the overall extruded thickness, with the thicknesses of the skin layers representing about 20 percent of the film thickness. The resultant film sheet was subsequently oriented eight by five and one-half times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits a lustrous, white appearance and the following properties.

Optical gage (measured through microscope: 33 μm
Poly gage (Polypropylene equivalent): 22.4 μm
Density: 0.62 g/cc
Light transmission: 22%

The degree of cavitation is indicated by film density, in g/cc, as calculated by dividing the weight of one square meter of film by the optical gage (μm).

EXAMPLE 18

This example demonstrates the effect on light transmission when lamellar graphite is added to the core mixture.

A mixture of 90 percent, by weight, isotactic polypropylene (MP=320° F., melt index=3), containing 8 weight percent PBT (MP=440° F.), as the core layer void-initiating material, and 2 percent lamellar graphite, is melted in an extruder with a screw of L/D ratio of 20/1 to provide the core layer mixture. A second extruder, in association with the first extruder, is supplied with the same isotactic polypropylene as the first extruder and about 1500 ppm of a finely divided silica antiblocking agent, this extruder used to provide the skin layer mixture. A melt coextrusion is carried out while maintaining the cylinder of the core polymer material at a temperature sufficient to melt the polymer mixture, i.e., from about 450° F. to about 550° F. or higher. The polypropylene mixtures of the second extruder to be used to form the skin layers is maintained at about the same temperature as the polypropylene used in fabricating the core layer. The mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by five and one-half times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits a pleasing, silvery appearance, not unlike aluminum foil, but containing no metal additive. The film also exhibits increased opacity over the control film of Example 17. The properties of the film so produced were as follows.

Optical gage: 35.5 μm
Poly gage: 22.3 μm
Density: 0.56 g/cc
Light transmission: 1.25%

Additionally the film of this example provides a very high barrier in the visible to the ultra violet light range and is acceptable for use as a low density packaging material for processing on printing presses and packaging machines.

EXAMPLE 19

This example demonstrates the effect on light transmission when iron oxide is directly substituted for the lamellar graphite of Example 18.

A mixture of 90 percent, by weight, isotactic polypropylene (MP=320° F., melt index=3), containing 8 weight percent PBT (MP=440° F.), as the core layer void-initiating material, and 2 percent iron oxide (Fe$_2$O$_3$), is melted in an extruder with a screw of L/D ratio of 20/1 to provide the core layer mixture. The iron oxide employed has a particle size of less than 1μ and is essentially spherical in shape. A second extruder, in association with the first extruder, is supplied with the same isotactic polypropylene as the first extruder and about 1500 ppm of a finely divided silica antiblocking agent, this extruder used to provide the skin layer mixture. A melt coextrusion is carried out while maintaining the cylinder of the core polymer material at a temperature sufficient to melt the polymer mixture, i.e., from about 450° F. to about 550° F. or higher. The polypropylene mixtures of the second extruder to be used to form the skin layers is maintained at about the same temperature as the polypropylene used in fabricating the core layer. The mixture of the second extruder is split into two streams to enable the formation of skin layers on each surface of the core layer.

A three-layer film laminate was coextruded with a core thickness again representing about 80 percent of the overall extruded thickness, with the thicknesses of the skin layers representing about 20 percent of the film thickness. The resultant film sheet was subsequently oriented eight by five and one-half times using a commercially available sequential biaxially orienting apparatus to provide a multi-layer film structure. The machine direction (MD) orientation is conducted at about 285° F. and the transverse direction (TD) orientation is conducted at about 300° F. The resultant multi-layer film exhibits increased opacity over the control film of Example 17. The properties of the film so produced were as follows.

Optical gage: 35.5 $\mu$m

Poly gage: 22.5 $\mu$m

Density: 0.56 g/cc

Light transmission: 3.3%

As may be seen by comparing the light transmission value measured for the film of Example 18 to that measured for the film of Example 19, light transmission is reduced by more than 60% when lamellar graphite is substituted for iron oxide as the opacifying material. As indicated in Example 19, the iron oxide used had a particle size of less than $1\mu$ and was essentially spherical in shape, while the graphite used in Example 18 had the desired lamellar shape and was similar in particle size to the iron oxide of Example 19.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. An opaque, biaxially oriented, polymeric film which comprises a matrix of (i) polypropylene in which are dispersed (ii) void-initiating solid particles which are phase-distinct from said polypropylene of said matrix and about which particles are located opacifying voids and a minor amount of (iii) light-absorbing graphite pigment having particles of a lamellar morphology, wherein said graphite has an average particle size which, of itself, is insufficient to cause voiding of said matrix.

2. A film according to claim 1, wherein said graphite has an average particle size of 0.2 to 2.0 microns.

3. A film according to claim 1, wherein said graphite is present in an amount of from 0.2 to 12 wt. % of the film.

4. A film according to claim 3, wherein said graphite is present in an amount of from 0.5 to 5 wt. % of the film.

5. A film according to claim 4, which further comprises a non-lamellar pigment.

6. A film according to claim 1, wherein the void-initiating solid particles comprise polybutylene terephthalate.

7. A film structure which comprises (a), as core layer, a film according to claim 1 and (b) at least one transparent skin layer adhering to the surface of the core layer and comprising a thermoplastic polymeric material, said skin layer being sufficiently thick to substantially prevent the asperities of the core layer from being manifest, the light transmission of the structure being less than about 15%.

8. A film structure according to claim 7, comprising three or more layers.

9. A film structure according to claim 8, wherein the graphite is present in the core layer only.

10. A film structure according to claim 9, wherein a non-lamellar pigment is present in said at least one skin layer.

11. A film structure according to claim 10, wherein said at least one skin layer (b) is immediately adjacent to the core layer (a), said skin layer comprising the same polymeric material as the matrix of the core layer (a).

12. A film structure according to claim 11, wherein the thickness of the core layer (a) is about 30 to about 95% of the thickness of the structure.

13. A process for the preparation of a film according to claim 1, which comprises:

(1) mixing a major proportion of said polypropylene (i) with a minor proportion of said void-initiating solid particles (ii);

(2) heating the mixture to a temperature above the melting point of said polypropylene (i);

(3) uniformly dispersing said void-initiating particles (ii) throughout said polypropylene (i);

(4) uniformly dispersing a minor amount of said graphite pigment (iii);

(5) forming a film from the resulting mixture; and (6) biaxially orienting the film at a temperature and deformation ratio effective to form opacifying voids therein.

14. A process according to claim 13, wherein said polypropylene (i) and said void-initiating solid particles (ii) are melted together in step (1).

15. A process according to claim 14, which further comprises the preparation of a film structure, comprising, either simultaneously with or subsequently to the formation of said film, adhering to at least one surface of said film (a) a transparent skin layer (b), said layer (b) comprising a thermoplastic polymeric material and being sufficiently thick to substantially prevent the asperities of said film from being manifest, the light transmission of the structure being less than about 15%.

16. A process according to claim 15, wherein the adhering step is effected by lamination or by coextrusion.

17. A process according to claim 16 wherein the biaxial orientation is effected after the adhesion of said layer (b) to said film (a).

18. A process according to claim 17, wherein the orientation in both directions is effected concurrently.

19. A process according to claim 18, wherein the orientation is effected at a temperature above 100° C.

* * * * *